United States Patent
Powell et al.

(10) Patent No.: US 10,480,533 B2
(45) Date of Patent: Nov. 19, 2019

(54) FLUID INJECTOR FOR COOLING A GAS TURBINE ENGINE COMPONENT

(71) Applicant: United Technologies Corporation, Hartford, CT (US)

(72) Inventors: Brad Powell, Guilford, CT (US); Anthony R. Bifulco, Ellington, CT (US); Paul E. Coderre, East Hampton, CT (US); John P. Virtue, Middletown, CT (US); Brian Lucker, Shelton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 543 days.

(21) Appl. No.: 14/916,425

(22) PCT Filed: Sep. 8, 2014

(86) PCT No.: PCT/US2014/054473
§ 371 (c)(1),
(2) Date: Mar. 3, 2016

(87) PCT Pub. No.: WO2015/038451
PCT Pub. Date: Mar. 19, 2015

(65) Prior Publication Data
US 2016/0222982 A1    Aug. 4, 2016

Related U.S. Application Data

(60) Provisional application No. 61/875,745, filed on Sep. 10, 2013.

(51) Int. Cl.
*F04D 29/58* (2006.01)
*F01D 9/06* (2006.01)
(Continued)

(52) U.S. Cl.
CPC ......... *F04D 29/5846* (2013.01); *F01D 9/065* (2013.01); *F01D 25/125* (2013.01);
(Continued)

(58) Field of Classification Search
CPC . F01D 5/08; F01D 5/081; F01D 5/082; F01D 9/065; F01D 25/125;
(Continued)

(56) References Cited

U.S. PATENT DOCUMENTS 3,487,993 A * 1/1970 Rannenberg ........ F04D 27/0223
244/59
4,456,427 A * 6/1984 Evans ..................... F01D 5/081
415/115
(Continued)

FOREIGN PATENT DOCUMENTS

EP    0735255    10/1996
EP    2011988    1/2009
(Continued)

OTHER PUBLICATIONS

JP2011-137389A Machine Translation. Accessed JPO Website Feb. 1, 2018. 10 Pages.*
(Continued)

*Primary Examiner* — Richard A Edgar
(74) *Attorney, Agent, or Firm* — Carlson, Gaskey & Olds, P.C.

(57) ABSTRACT

An example method of cooling a compressor of a gas turbine includes, among other things, diverting a flow from a compressor, and directing the flow at the compressor in a direction, the direction having a circumferential component and an axial component.

4 Claims, 6 Drawing Sheets

(51) Int. Cl.
  *F01D 25/12* (2006.01)
  *F04D 29/54* (2006.01)
  *F02C 7/14* (2006.01)
  *F02K 3/04* (2006.01)
  *F04D 29/32* (2006.01)

(52) U.S. Cl.
  CPC .............. *F02C 7/14* (2013.01); *F02K 3/04* (2013.01); *F04D 29/321* (2013.01); *F04D 29/541* (2013.01); *F04D 29/584* (2013.01); *F04D 29/5826* (2013.01); *F05D 2220/3219* (2013.01); *F05D 2220/36* (2013.01); *F05D 2240/127* (2013.01); *F05D 2260/20* (2013.01); *F05D 2260/213* (2013.01)

(58) Field of Classification Search
  CPC ........... F04D 299/5846; F04D 299/321; F04D 299/541; F04D 299/5826; F04D 299/584; F05D 2220/3219; F05D 2220/36; F05D 2240/127; F05D 2260/20; F05D 2260/213; F02K 3/04; F02C 7/14
  See application file for complete search history.

(56) References Cited

U.S. PATENT DOCUMENTS

| | | | | |
|---|---|---|---|---|
| 4,730,978 A * | 3/1988 | Baran, Jr. | ............. | F01D 5/3015 415/115 |
| 4,822,244 A | 4/1989 | Maier et al. | | |
| 5,245,821 A * | 9/1993 | Thomas, Jr. | ............. | F01D 9/02 415/116 |
| 5,685,158 A * | 11/1997 | Lenahan | ................. | F01D 5/081 416/95 |
| 5,759,012 A | 6/1998 | Glezer et al. | | |
| 5,782,076 A | 7/1998 | Huber et al. | | |
| 5,997,244 A | 12/1999 | Gebre-Giorgis et al. | | |
| 6,183,193 B1 | 2/2001 | Glasspoole et al. | | |
| 8,186,933 B2 * | 5/2012 | Doss | ....................... | F01D 5/066 415/1 |
| 2001/0039794 A1 | 11/2001 | Rocklin et al. | | |
| 2005/0047902 A1 * | 3/2005 | Hudson | ................... | F01D 5/081 415/1 |
| 2007/0251210 A1 | 11/2007 | Ceric et al. | | |
| 2008/0041064 A1 * | 2/2008 | Moore | .................... | F01D 5/081 60/782 |
| 2008/0141677 A1 | 6/2008 | Brillert | | |
| 2009/0074589 A1 * | 3/2009 | Fang | ...................... | F01D 25/12 416/97 R |
| 2010/0275612 A1 | 11/2010 | Smoke et al. | | |
| 2012/0114459 A1 * | 5/2012 | Benkler | ................. | F01D 5/081 415/1 |
| 2013/0167546 A1 | 7/2013 | Chin | | |

FOREIGN PATENT DOCUMENTS

| | | | | |
|---|---|---|---|---|
| EP | 2256294 | | 12/2010 | |
| FR | 900439 | | 6/1945 | |
| GB | 2270118 | | 3/1994 | |
| GB | 2270118 A | * | 3/1994 | ............. F01D 11/24 |
| GB | 2320295 | | 6/1998 | |
| JP | 2011137389 A | * | 7/2011 | |

OTHER PUBLICATIONS

International Report on Patentability for Application No. PCT/US2014/054473 dated Mar. 24, 2016.
Supplementary Partial European Search Report for Application No. 14843887.2 dated Feb. 28, 2017.
International Search Report and Written Opinion for Application No. PCT/US2014/054473 dated Dec. 12, 2014.
Supplementary European Search Report for European Patent Application No. 14843887 completed Jun. 9, 2017.

* cited by examiner

FLUID INJECTOR FOR COOLING A GAS TURBINE ENGINE COMPONENT

CROSS-REFERENCE TO RELATED APPLICATION

This application claims priority to U.S. Provisional Application No. 61/875,745 filed Sep. 10, 2013.

BACKGROUND

This disclosure generally relates to cooling a gas turbine engine component and, more particularly, to a fluid injector for cooling the compressor A gas turbine engine typically includes a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor section, and other engine loads. The compressor section may include low and high pressure compressors.

During engine operation, the compressor section, and especially the high pressure compressor, experiences high temperatures. Prolonged exposure to high temperatures can shorten the useful service lifetime of the compressor section. In order to achieve a desired service lifetime, exposure to high temperature must be limited, which in turn limits the ability of the compressor to generate high pressures. High operating pressures may improve the efficiency of the compressor section and overall efficiency of the engine and thus are often desired. Some compressor sections may employ various cooling arrangements to reduce the temperatures of certain components while still operating at relatively high temperatures and producing high pressures.

SUMMARY

A method of cooling a compressor of a gas turbine engine according to an exemplary aspect of the present disclosure includes, among other things, diverting a flow from a compressor, and directing the flow at the compressor in a direction, the direction having a circumferential component and an axial component.

In another exemplary aspect of the foregoing method, the method comprises removing thermal energy from the flow.

In another exemplary aspect of any of the foregoing methods, the method includes using a heat exchanger for the removing.

In another exemplary aspect of any of the foregoing methods, the directing comprises directing the flow against a rim of an aftmost stage of the compressor.

In another exemplary aspect of any of the foregoing methods, the axial component of the direction is opposite a general direction of core flow through the gas turbine engine.

In another exemplary aspect of any of the foregoing methods, the method includes directing the flow using an array of nozzles that each extend from a nozzle inlet to a respective nozzle outlet that is circumferentially offset from the nozzle inlet.

In another exemplary aspect of any of the foregoing methods, the method includes directing the flow at the compressor at a position that is radially aligned with an aft rotor rim of the compressor.

In another exemplary aspect of any of the foregoing methods, the method includes directing the flow at the compressor at a position that is radially inboard from an aft rotor rim of the compressor.

In another exemplary aspect of any of the foregoing methods, the compressor has a direction of rotation and the circumferential component is in a direction that is the same as the direction of rotation.

A fluid injector for a gas turbine engine according to an exemplary aspect of the present disclosure includes, among other things, an array of nozzles distributed circumferentially about an axis of rotation of the gas turbine engine. The array of nozzles includes nozzles that extend from nozzle inlets to respective nozzle outlets, the nozzle inlets circumferentially offset from the nozzle outlets.

In another example of the foregoing fluid injector, the fluid injector includes, among other things, an annular rim and an array of guides extending radially from the annular rim, the array of nozzles arranged circumferentially between the array of guides.

In another example of the foregoing fluid injector, the fluid injector includes, among other things, the circumferential component is in a direction that is the same as the direction of rotation of a compressor of the gas turbine engine.

In another example of the foregoing fluid injector, the fluid injector includes, among other things, the circumferential component is tangential to the rotor rim of a compressor of the gas turbine engine.

A gas turbine engine according to an exemplary aspect of the present disclosure includes, among other things, a compressor and a fluid injector to communicate a flow at rotor rim of the compressor in a direction having a circumferential component.

In another example of the foregoing gas turbine engine, the fluid injector injects flow in a direction that is opposite to a general direction of flow through the gas turbine engine.

In another example of any of the foregoing gas turbine engines, the gas turbine engine includes a heat exchanger to communicate the flow to the fluid injector.

In another example of any of the foregoing gas turbine engines, the fluid injector includes an array of nozzles that are radially aligned with an aft rotor rim below the blade platform of the compressor.

In another example of any of the foregoing gas turbine engines, the flow to the fluid injector is supplied by the compressor.

In another example of any of the foregoing gas turbine engines, the flow to the fluid injector is supplied by an aftmost compressor stage of a high pressure compressor.

The various features and advantages of the disclosed examples will become apparent to those skilled in the art from the detailed description. The figures that accompany the detailed description can be briefly described as follows:

DETAILED DESCRIPTION

Figure 1:
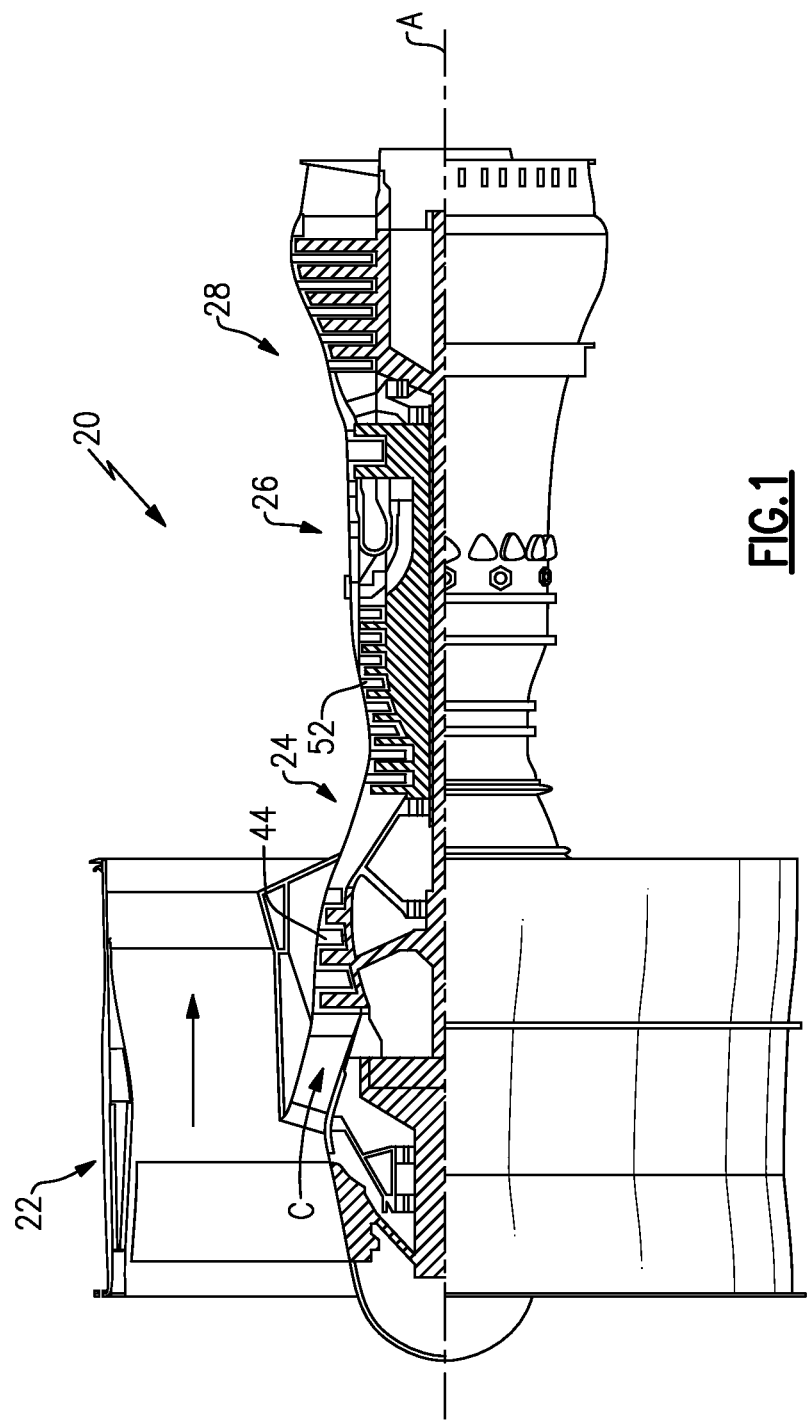
FIG. 1 schematically illustrates an example gas turbine engine.
Figure 2:
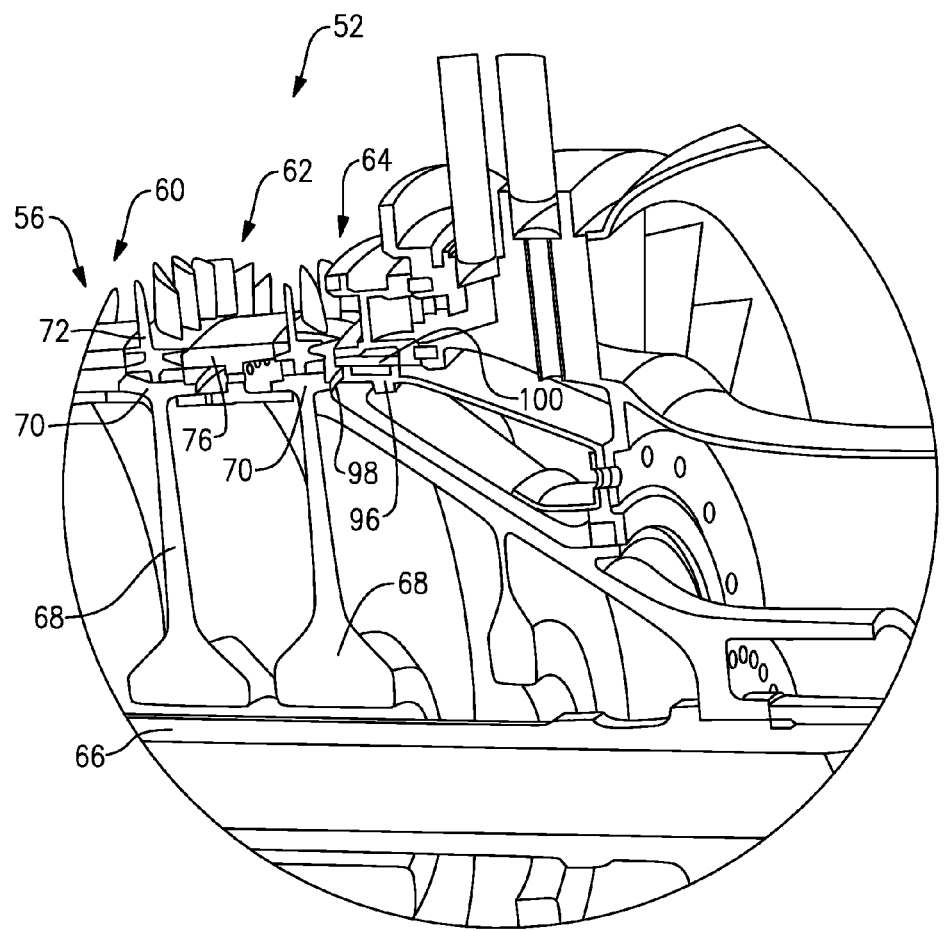
FIG. 2 illustrates a schematic section view of portions of a fluid injector and portions of a high pressure compressor of the engine of FIG. 1.

FIG. 1 schematically illustrates an example gas turbine engine 20. The example gas turbine engine 20 is a two-spool turbofan that generally incorporates a fan section 22, a compressor section 24, a combustor section 26, and a turbine section 28. The fan section 22 drives a bypass flow along a bypass flowpath while the compressor section 24 drives a core flow C for compression. The flow C communicates for the compressor section 24 into the combustor section 26 then is expanded through the turbine section 28. The compressor section 24 may include a low pressure compressor 44 and a high pressure compressor 52.

In this example, the gas turbine engine 20 is a geared gas turbine engine, and the fan section 22 rotates at a different speed than the turbine section 28. However, the examples in this disclosure are not limited to implementation in the geared gas turbine architecture described, and may be used in other architectures such as a direct drive two-spool gas turbine engine, a three-spool gas turbine engine, or a single spool turbojet.

There are various types of gas turbine engines, and other turbomachines, that can benefit from the examples disclosed herein. Also, although depicted as a turbofan gas turbine engine in the disclosed non-limiting embodiment, it should be understood that the concepts described herein are not limited to use with turbofans as the teachings may be applied to other types of turbine engines.

Referring to FIGS. 2-8 with continuing reference to FIG. 1, a high pressure compressor 52 of the compressor section 24 includes several rotor stages 60, 62, 64. In the example shown, stage 64 is the aftmost stage. The stages 60, 62, 64 are connected to one another via an annular rotor hub 66 assembly. In another example, the stages 60, 62, 64 may be interconnected by bolted assemblies, welded assemblies, or by other fastening means. While the high pressure compressor 52 is shown, it should be understood that the examples in this disclosure may be used in connection with other types of compressors, such as the low pressure compressor 44, or an intermediate pressure compressor (for the three-spool gas turbine engine).

Each of the stages 60, 62, 64 includes a disc 68, a rim 70, and a blade 72. The disc 68 supports the rim 70, which supports the blade 72. Spacers 76 are positioned axially between the rim 70 of adjacent rotor stages 60, 62, 64. The spacers 76 can interface with cantilevered stators. In another example, the spacers 76 are non-rotating and directly support stators.

During operation, the core flow C flows past the blades 72 and is compressed. Core flow C exits the compressor section 24 through the aftmost stage 64. Thermal energy levels in portions of the high pressure compressor 52 increases during operation.

Significant variations in thermal energy levels within portions of the high pressure compressor 52 may be undesirable. The example gas turbine engine 20 thus includes features to reduce these variations. Specifically, a fluid injector 74 is used to direct a thermal management flow F at a rotor assembly 56 of the high pressure compressor 52 to reduce these variations. The flow F may cool or heat an area of the compressor section 24 as is desired.

Figure 3:
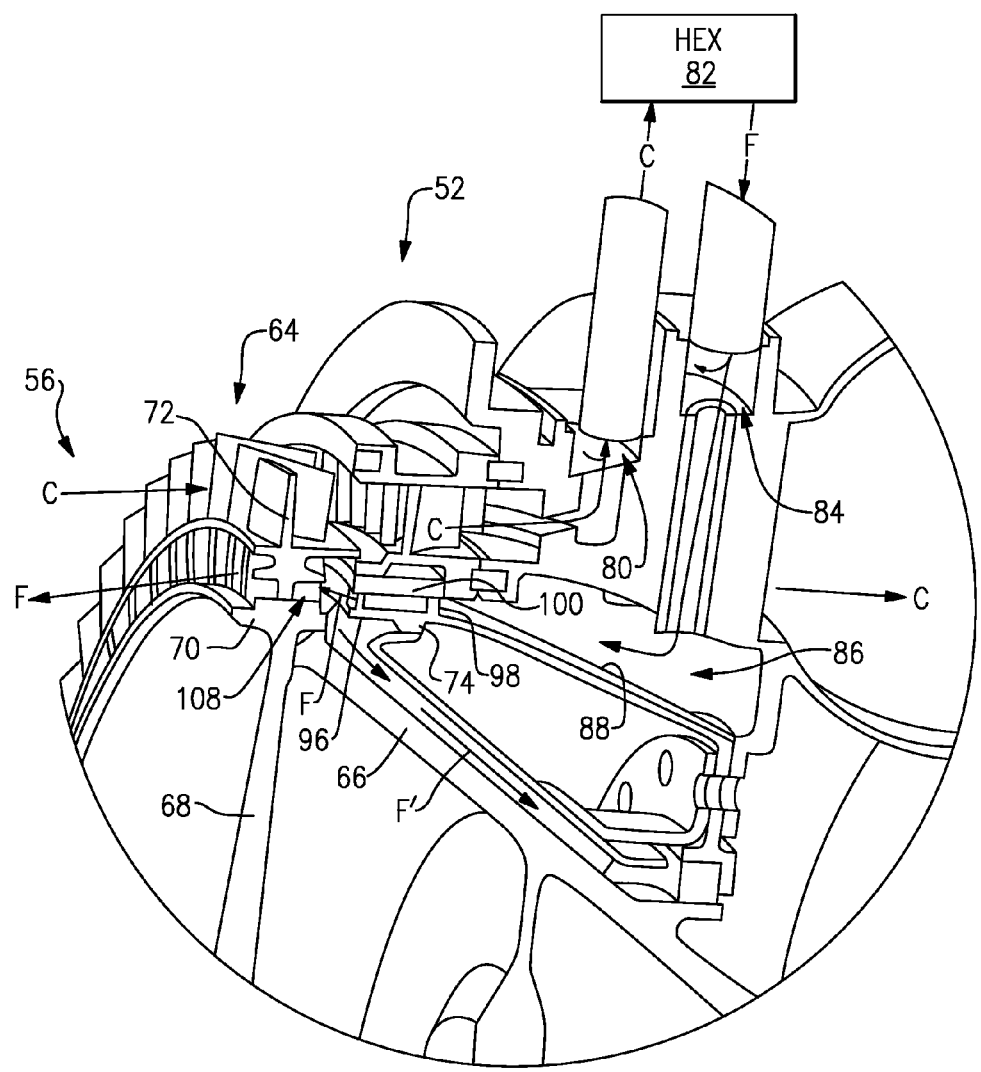
FIG. 3 illustrates another schematic section view of portions of the fluid injector and portions of the high pressure compressor of the engine of FIG. 2.

Referring to FIG. 3, the rotor assembly 56 rotates during operation. Directing the flow F with the fluid injector 74 in a tangential manner relative to the rotor assembly facilitates efficiently mixing the flow F with flow around the rotor assembly 56 without excessive turbulence or pressure losses. The flow F directed through the fluid injector 74 can be closely matched in speed to a rotational velocity of the rotor assembly 56. This facilitates the flow F efficiently entering the cavities of the rotor assembly 56 without excessive turbulence or pressure losses.

In this example, a portion of the core flow C is diverted to provide the thermal management flow F. This flow F is directed through the fluid injector 74. The remaining core flow C continues to move aftward in the engine 20 toward the combustor section 26, and the turbine section 28.

The flow F can be drawn from the core flow C using ports, scoops, slots, front-facing inlet tubes, or some other feature for diverting flow from the core flow C.

The flow F is drawn from the aftmost stage 64 in this example. In another example, flow F may be drawn from an upstream (i.e. axially forward) stage 60, 62 rather than the aftmost stage 64.

In one example, the flow F is drawn from the radial midpoint of the core flow C flow path. This helps ensure that the highest pressure and lowest temperature air from the core flow C is used to provide the flow F. The flow F may also be drawn from any radial point of the core flow C flow path (i.e. any point other than the midpoint).

The flow F drawn from the flow C is communicated to a first plenum 80, which is annular in this example. The flow C is then passed through a heat exchanger (HEX) 82 to selectively remove thermal energy from the flow F. The heat exchanger 82 may be any type of heat exchanger, for example, an air-air cooler, an oil-air cooler, etc. The flow passing through the example heat exchanger 82 experiences only a slight change in pressure.

The amount of thermal energy removed from the flow F by the heat exchanger 82 may be selectively varied to allow for optimal conditioning of the flow F. For example, in some engine 20 operating modes, the heat exchanger 82 may be turned off so effectively no thermal energy is removed from the flow F. In other modes, the heat exchanger 82 may cool the flow F by removing a substantial amount of thermal energy.

After communicating through the heat exchanger 82, the flow F is moved to a second plenum 84 and then radially inward further to a third plenum 86 (FIG. 3). In this example, a flange 88 of the fluid injector 74 defines a portion of the third plenum 86. The second and third plenums 84 and 86 are also annular in this example.

The flow F moves from the third plenum 86 to the fluid injector 74 and is used to reduce temperature gradients through components of the compressor section 24 to improve component lifetimes.

The fluid injector 74 has the form of a tangential on-board injector (TOBI). In this example, the fluid injector 74 directs the flow F at the rim 70 of the rotor assembly 56. The rim 70 is an aft rotor rim in this example. In another example, the fluid injector 74 directs the flow F into the under-blade inlet cavities of the rotor stage 64, which are radially inboard the aft rotor rim.

Figure 7:
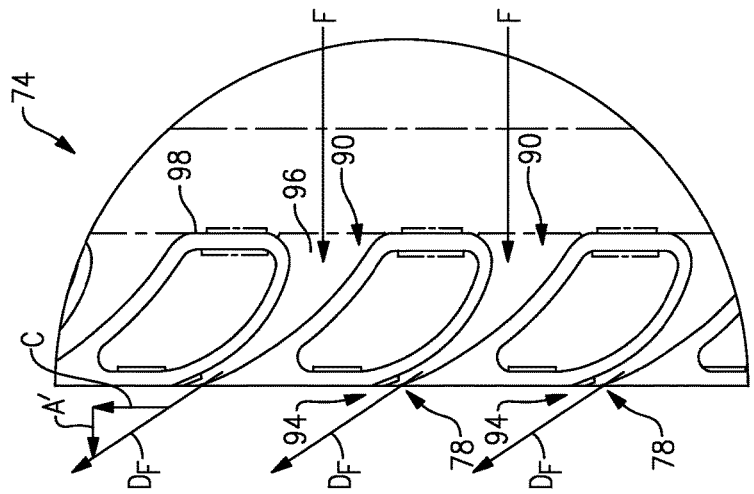
FIG. 7 shows a close-up view of a portion of the section view of FIG. 6.
Figure 6:
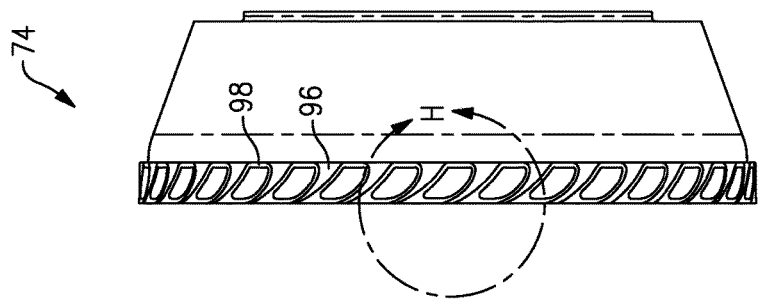
FIG. 6 shows a section view of the fluid injector of FIG. 5.
Figure 5:
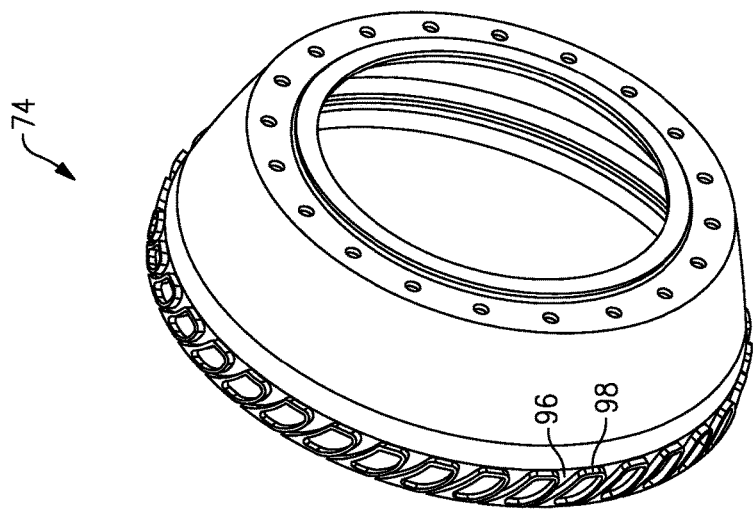
FIG. 5 shows a perspective view of the fluid injector of FIGS. 2 and 3.
Figure 8:
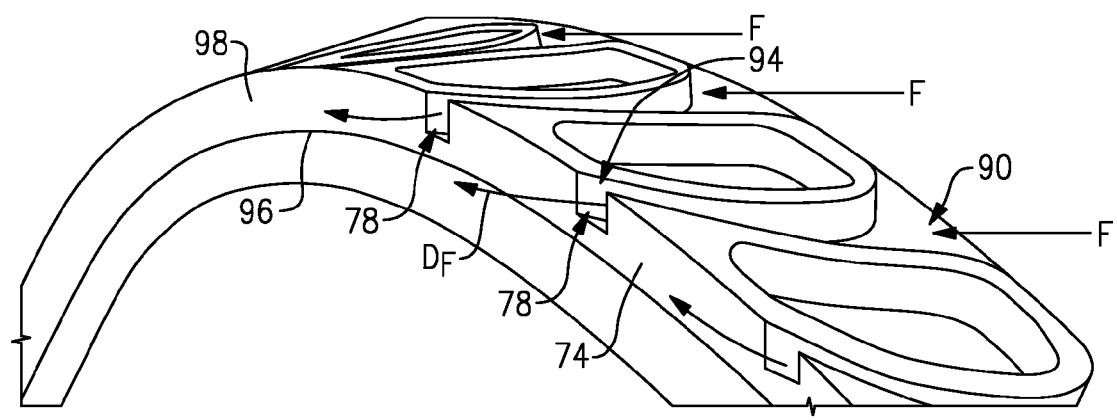
FIG. 8 shows a schematic section view of the fluid injector.

The example fluid injector 74 turns and directs the flow F. That is, the fluid injector 74 directs the flow F in a direction $D_F$ that has both a circumferential component C and an axial component A' (FIG. 7). The circumferential component C is in the same direction as the direction of rotation of the rotor assembly 56. The axial component A' is opposite to the general direction of flow through the engine 20. The core flow C travels in the general direction of flow through the engine 20.

The fluid injector 74 can be further configured to direct the flow F in a tangential manner toward the rotor assembly 56, or to achieve a tangential velocity relative to the rotor assembly 56.

The example fluid injector 74 can also be configured to accelerate the flow F through an array of nozzles 78. The flow F may be accelerated to a velocity that is more closely matched to a rotational velocity of the rotor assembly 56. That is, flow F which, may be accelerated, exits the nozzles with a tangential velocity that is at or near than the rotational velocities of the cooling passages of the rotor assembly 56.

The array of nozzles 78 are cascading nozzles in this example and are distributed circumferentially about the axis A. Cascaded nozzles allow the flow F to accelerate with relatively little change in pressure or temperature, to have a relatively controlled flow stream direction and pattern, and with a relatively controlled Mach number and static pressure.

To direct the flow circumferentially, each of the nozzles in the array of nozzles 78 extends from a nozzle inlet 90 to a respective nozzle outlet 94. Notably, the nozzle inlets 90 are circumferentially offset from the nozzle outlets 94.

The example fluid injector 74 includes an inner rim 96 and an array of guides 98 extending radially from the inner rim 96. The array of guides 98, in this example, extend from the inner rim 96 to an outer rim 100 that is radially outside the inner rim 96. In another example, the outer rim 100 is not utilized. The inner rim 96 and outer rim 100 are both annular.

The array of nozzles 78 are arranged circumferentially between the array of guides 98. The guides 98, in some examples, can be hollow (FIG. 7) to reduce the overall weight of the fluid injector 74.

The fluid injector 74 is machined, in one example, from a single piece of material. The fluid injector 74 may also be fabricated to final net shape using any number of other manufacturing methods, either alone or in combination, including but not limited to casting, forging, drawing, additive, powder metallurgy, or a multi-piece welded assembly.

Notably, the example fluid injector 74 directs flow F at the rotor assembly 56 without relatively elaborate inboard and outboard seals. Instead, a pressure balance approach is used to prevent undue losses or mixing with the core flow C. In the example fluid injector 74, the static pressures across the lap seal at position 104 are balanced. This design approach effectively balances static pressures at areas 106 and 108, which inhibits significant inflow and outflow of air at the position 104.

This design approach can balance flows at specific operating conditions, such as a takeoff condition or takeoff rotational velocity, when cooling demand is the greatest. At other conditions, such as idle and cruise, where moving flow to the rotor assembly 56 through the fluid injector 74 may not be necessary, the heat exchanger 82 can be shut down or tapered down. If the flow F is not cooled with the heat exchanger 82, the efficiency impact due to the ingestion or outflow is negligible.

Figure 4:
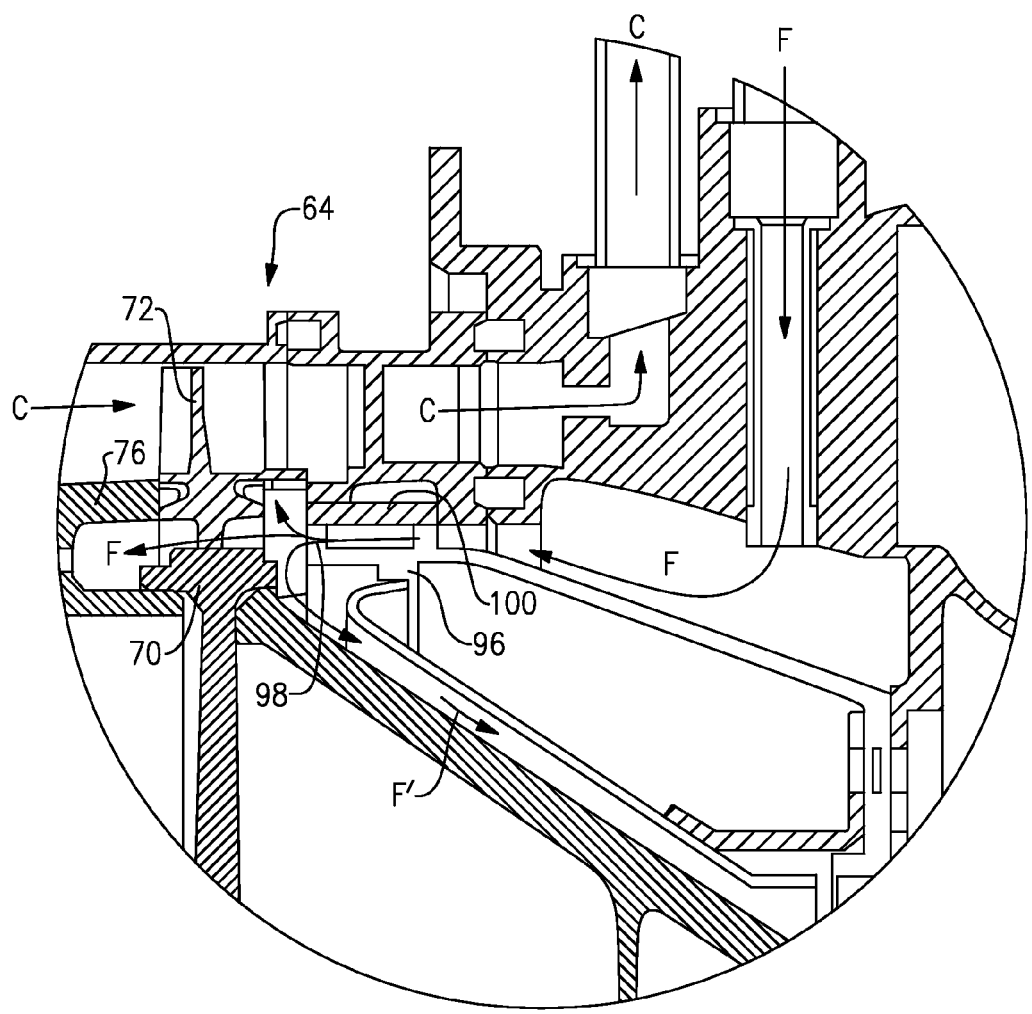
FIG. 4 illustrates another side view of portions of the fluid injector and portions of the high pressure compressor of FIGS. 2 and 3.

Referring to FIGS. 3 and 4, some of the flow F may communicate from the fluid injector 74 and pass over the rotor hub 66 rather than communicate to the rotor assembly 56. This flow is designated as flow F'. The flow F' along the rotor hub 66 moves in a relatively controlled manner and may carry thermal energy from the rotor hub 66. To control flow down the hub, downstream flow inhibitors may be used.

Features of the disclosed examples may include identifying an efficient method for delivering cooling air onto or into a stage of a compressor. The disclosed TOBI may have a relatively low weight impact, and of significantly physical size, as compared to prior art TOBIs used with turbines. Smaller size and weight is enabled by the cascaded nozzle design which facilitates static pressure balancing between streams F and C, thereby allowing for, in some examples, a design with relatively simplified inboard seals compared to prior art TOBI designs. The example fluid injector may be scalable to a number of different compressor designs. The example fluid injector may be modular and may be used with a number of possible air extraction techniques/systems, and a number of possible heat exchanger solutions.

Although an embodiment of this invention has been disclosed, a worker of ordinary skill in this art would recognize that certain modifications would come within the scope of this invention. For that reason, the following claims should be studied to determine the true scope and content of this invention.

We claim:

1. A gas turbine engine, comprising:
    a compressor;
    a fluid injector to communicate a flow at a rotor rim of the compressor in a direction having a circumferential component, wherein the fluid injector injects flow in a direction that is opposite to a general direction of flow through the gas turbine engine, and the circumferential component is in a direction that is the same as the direction of rotation of the compressor; and
    a low pressure compressor, wherein the compressor is a high pressure compressor axially aft of the low pressure compressor, the flow to the fluid injector is supplied by an aftmost compressor stage of the compressor, the fluid injector includes an array of nozzles that are radially aligned with an aft rotor rim below a blade platform of the compressor, and wherein the fluid injector includes an annular rim and an array of guides extending radially from the annular rim, the array of nozzles arranged circumferentially between the array of guides;
    wherein each guide of the array of guides is hollow and includes a planar front face and a planar rear face spaced apart by opposed side walls, the planar front face of each guide of the array of guides arranged along a common first reference plane, the planar rear face of each guide of the array of guides arranged along a common second reference plane, and adjacent side walls of the respective guides are dimensioned such that the respective nozzle of the array of nozzles accelerates the flow; and
    wherein the fluid injector includes an annular flange sloping radially inwardly from the annular rim to bound an annular plenum, the annular plenum configured to communicate the flow from the aftmost compressor stage of the compressor to the array of nozzles.

2. The gas turbine engine of claim 1, wherein the circumferential component is tangential to the rotor rim of the compressor.

3. The gas turbine engine of claim 1, including a heat exchanger to communicate the flow to the fluid injector.

4. A gas turbine engine comprising:
a compressor;
a fluid injector to communicate a flow at a rotor rim of the compressor in a direction having a circumferential component, wherein the fluid injector injects flow in a direction that is opposite to a general direction of flow through the gas turbine engine, and the circumferential component is in a direction that is the same as the direction of rotation of the compressor; and
a low pressure compressor, wherein the compressor is a high pressure compressor axially aft of the low pressure compressor, the flow to the fluid injector is supplied by an aftmost compressor stage of the compressor, the fluid injector includes an array of nozzles that are radially aligned with an aft rotor rim below a blade platform of the compressor, and wherein the fluid injector includes an annular rim and an array of guides extending radially from the annular rim, the array of nozzles arranged circumferentially between the array of guides;
wherein each guide of the array of guides is hollow and includes a planar front face and a planar rear face spaced apart by opposed side walls, the planar front face of each guide of the array of guides arranged along a common first reference plane, the planar rear face of each guide of the array of guides arranged along a common second reference plane, and adjacent side walls of the respective guides are dimensioned such that the respective nozzle of the array of nozzles accelerates the flow;
wherein the array of nozzles each extend from a nozzle inlet to a respective nozzle outlet;
wherein the nozzle outlet is oriented to direct the flow in a direction having a circumferential component and an axial component, the axial component being opposite a general direction of core flow through the gas turbine engine, the circumferential component being in a direction that is the same as a direction of rotation of the high pressure compressor, and the circumferential component being tangential to the aft rotor rim; and
wherein the nozzle outlet is a slot defined along the common second reference plane, the opposed side walls include a first sidewall and a second sidewall that circumferentially bound a hollow cavity within the respective guide such that the hollow cavity follows a contour of the first and second sidewalls, the first sidewall has a convex profile, the second sidewall has a concave profile such that the respective guide tapers to a tip portion along the planar rear face to define the nozzle outlet, and the tip portion is circumferentially offset from the respective nozzle inlet.

* * * * *